E. WHALLEY.
TRUCK.
APPLICATION FILED SEPT. 26, 1916.
1,230,251.
Patented June 19, 1917.
2 SHEETS—SHEET 1.
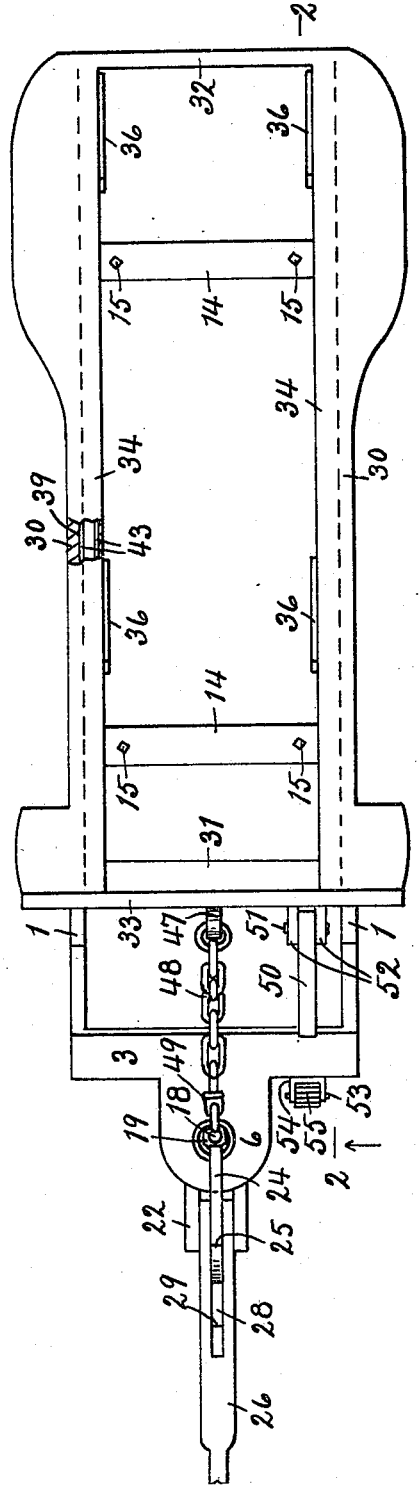
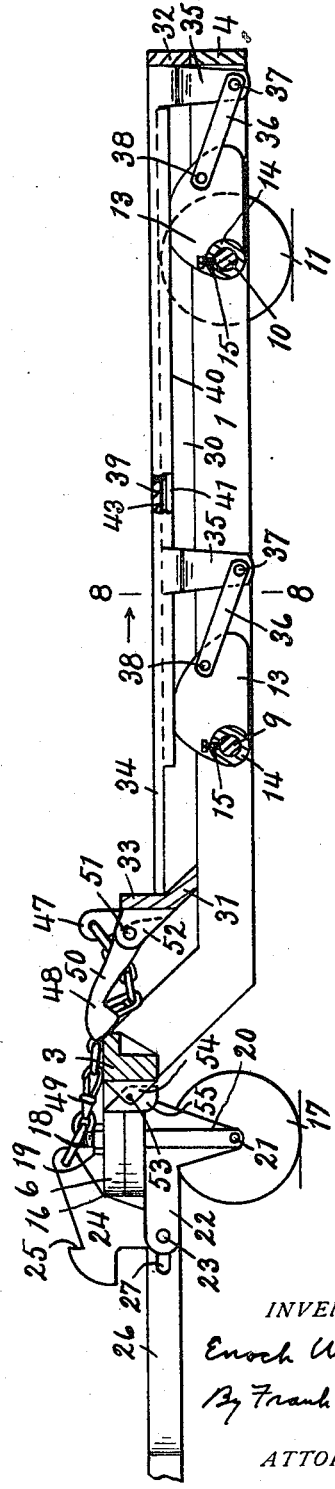
INVENTOR.
Enoch Whalley,
By Frank A. Cutter,
ATTORNEY.

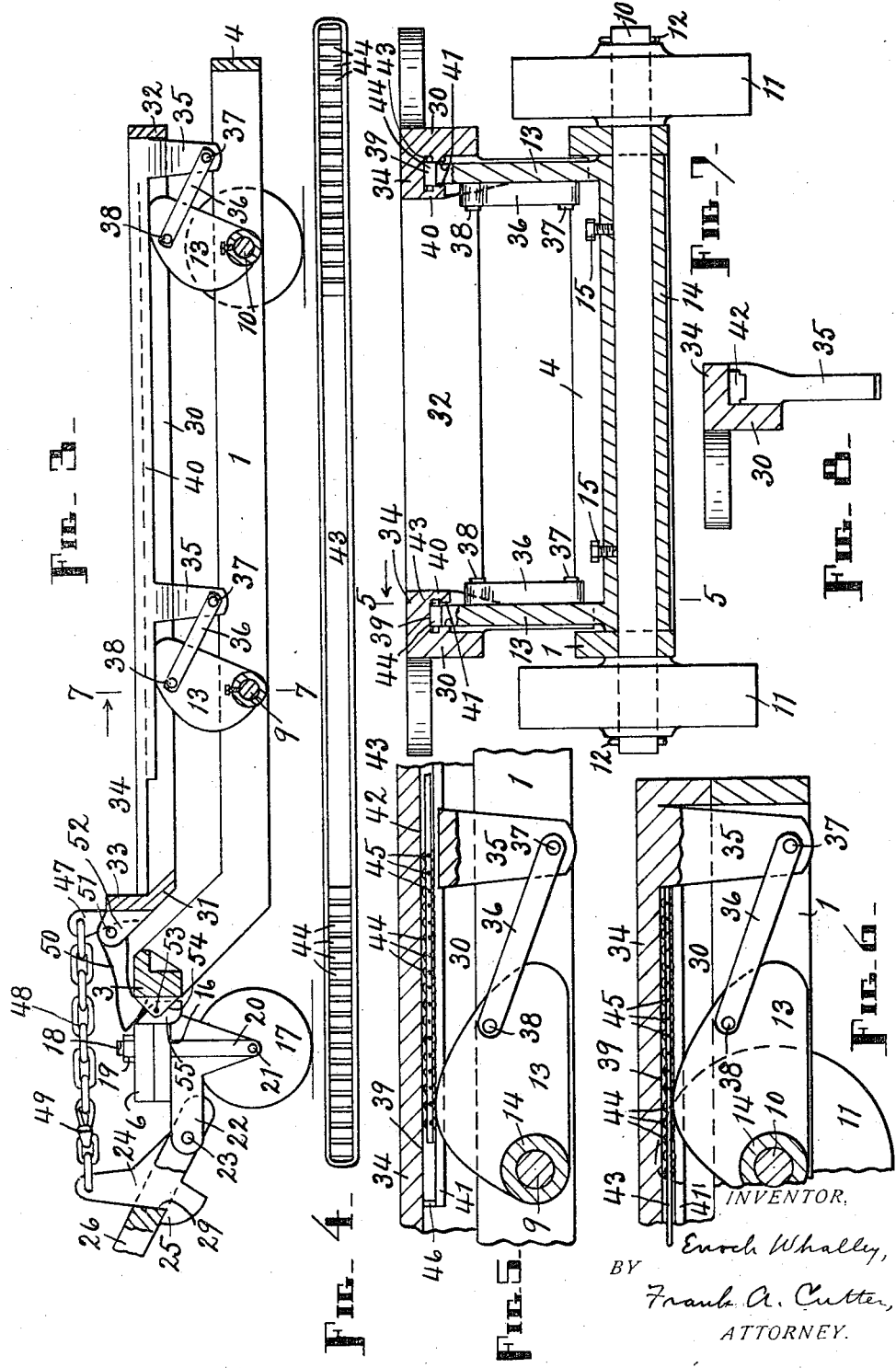

UNITED STATES PATENT OFFICE.

ENOCH WHALLEY, OF WILLIMANSETT, MASSACHUSETTS.

TRUCK.

1,230,251. Specification of Letters Patent. Patented June 19, 1917.

Application filed September 26, 1916. Serial No. 122,224.

*To all whom it may concern:*

Be it known that I, ENOCH WHALLEY, a citizen of the United States of America, residing at Willimansett, in the county of Hampden and State of Massachusetts, have invented a new and useful Truck, of which the following is a specification.

My invention relates to improvements in trucks of the elevating type, wherein a longitudinal movement is converted into an upward movement, for use in hauling goods about by hand, and consists essentially of certain peculiar truck sections and the operating mechanism therefor, the latter including means wherewith the upper section is raised from the lower section or elevated and lowered or depressed, together with anti-friction elements, and such auxiliary and subsidiary parts and members as may be necessary or desirable in order to render the truck serviceable and practicable for the purposes for which it is intended, all as hereinafter set forth.

The primary object of my invention is to produce a very simple, both structurally and operatively, comparatively inexpensive, strong and durable, and highly efficient truck, for use in raising goods or material from the support therefor, or with such support, from the floor, hauling such goods or material to the desired locality, and then lowering and depositing the same. In this truck not only is the amount of friction reduced to the minimum, but provision is made by the peculiar raising and lowering means or mechanism for equalizing the load as it were, wherefore comparatively little effort is required on the part of the operator to handle easily and successfully a very heavy load.

The equalizing effect produced by the raising and lowering mechanisms, referred to above, may be said to be inherent in said mechanism, and is thus explained: The load in being elevated is started upward slowly and with the minimum expenditure of force, and then as said load continues to rise the same force is in part absorbed as it were in the increased speed with which said load moves, so that such minimum expenditure is continuous, and, conversely the same thing is true or the same action or kind of action takes place when the load is lowered. It is thus clear that both the raising and lowering operations, from start to finish, may easily and quickly be performed under conditions which require the putting forth of an approximately uniform amount of force on the part of the operator, so that he is not required to strain unduly either in starting a load upwardly or in restraining a load as it approaches the limit of its downward travel.

The truck, while itself light in weight, is capable of handling a load of great weight; and said truck, although having an adequate range of elevation, is sufficiently low, when the upper section is down in its lowest position, to be operated in connection with a stack of goods or material that is supported very close to the floor, which is an important feature in a truck of this type.

Other objects and advantages will appear in the course of the following description.

A preferred embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a top plan of a truck which embodies the invention as aforesaid, the upper section being in its low position, the forward portion of the handle or tongue broken off, and a portion of said upper section on one side broken away to show a part of the anti-friction truck frame on that side; Fig. 2, a longitudinal vertical section through said truck taken on lines 2—2, looking in the direction of the associated arrow, in Fig. 1, a portion of said upper section being here broken out also, in order to show a part of said anti-friction truck frame; Fig. 3, a similar section except that said upper section is in elevated position and locked in such position; Fig. 4, an enlarged plan of one of the anti-friction trucks; Fig. 5, an enlarged fragmentary detail in section, as though taken on lines 5—5, looking in the direction of the associated arrow, in Fig. 7, if in said Fig. 7 the upper truck section were down, such detail showing one of the front cams and associated parts, including the forward portion of the anti-friction truck above; Fig. 6, an enlarged fragmentary detail in section, which is complementary to the preceding view, showing as it does the other cam and associated parts, on the same side, and the rear portion of said anti-friction truck; Fig. 7, an enlarged transverse vertical section through the truck, on lines 7—7, looking in the direction of the associated arrow, Fig. 3, and, Fig. 8, an enlarged fragmentary detail, on lines 8—8 looking in the direction of the associated arrow, Fig. 2.

The truck, in the present form, comprises an under section or carriage, which is a body or frame mounted on rolls or wheels, a superimposed or upper section or platform capable of moving longitudinally and upwardly relative to said carriage; equalizing lifters, in the form of cams, and cam-operating members arranged between said sections relatively, said cams constituting the movable supports for said upper section or platform and they with their operating members being the direct means whereby said platform is raised and lowered; actuating means for drawing said platform forward on said under section or carriage or forcing the latter backward under the former, as the case may be, to elevate said platform; a handle or tongue which is adapted to be interlocked with and disengaged from said actuating means, and with which the truck is moved about and said platform-actuating means operated and controlled to raise and lower said platform, and automatic locking and automatic co-acting releasing means for said platform when in raised position. There are also provided anti-friction elements which are interposed between the cam lifters or lifter cams and the platform, for the obvious purpose of reducing the friction incident to the raising and lowering operations to the minimum.

The body or frame of the carriage may be and in this case is a unitary structure of integral parts, which latter consist of two side-pieces 1 turned upwardly at their front ends and connected by a cross-piece 3 to form a raised head, and connected at their rear ends by a cross-piece 4. The cross-piece or head 3 has a central, forwardly-extending, flat projection 6. The head 3 forms a stop which limits the forward movement of the platform or the rearward movement of the carriage, relatively, as will presently more clearly appear.

Rock-shafts 9 and 10 are journaled in the side-pieces 1, the rock-shaft 10 being located adjacent to but somewhat forward of the rear cross-piece 4, and the rock-shaft 9 being located well in advance of the other. The rock-shaft 10 extends at both ends beyond the side-pieces 1 to serve as an axle for wheels 11—11 which are loosely mounted on these projecting terminals of said rock-shaft, outside of said side-pieces, said wheels being prevented from coming off of said terminals by cotter-pins 12—12 passed therethrough.

A plurality of lifters or cams 13 are secured to the rock-shafts 9 and 10, there preferably being such a cam at or adjacent to each end of each rock-shaft, just inside of the side-piece 1 at that end. In this case, the cams 13 in each pair are at the ends of and integral with a sleeve 14 on either rock-shaft (9 or 10), which sleeve fits between the side-pieces 1 and is secured by bolts 15—15 to the rock-shaft upon which it is mounted. It is thus seen that the bolts 15 hold the rock-shafts 9 and 10 against endwise movement. The sleeves 14 stiffen the structure and augment the stability of the cams 13. The cams 13 are all alike, and they are so formed and arranged that they are capable, when rocked upwardly and forwardly from a rearward position, of imparting an upward movement to the member or members supported thereon.

The wheels 11 support the carriage at the rear end, and said carriage is supported at the front end by a swivel 16 and a wheel 17, the projection 6 resting directly on said swivel and the latter being rotatably secured thereto by a bolt 18 that passes upwardly through the top of said swivel and through said projection, and a nut 19 on the upper end of said bolt. The bolt 18 is the king-pin of the truck. The wheel 17 is mounted between lugs 20, which form parts of the swivel 16, on an axle 21 that is journaled in said lugs. Projecting forwardly from the swivel 16 at the top are two more lugs 22 having a pin 23 at their front ends.

An angular latch 24 is mounted at one end to swing on the pin 23, which latch has a tooth 25. A tongue 26 is also mounted at its inner end to swing on the pin 23, said tongue having a slot 27 therein to receive said pin and permit said tongue to move longitudinally thereon. The latch 24 is received and operates in a slot 28 provided for it in the tongue 26, and the latter has a tooth 29 which may be engaged with and disengaged from the latch tooth 25. In Figs. 1 and 2 the tongue 26 is out of engagement with the latch 24 and free to be used in hauling the truck about, while in Fig. 3 said tongue and latch are in operative engagement. The construction and operation of these parts and members are practically identical with the construction and operation of corresponding parts and members in my United States Letters Patent, No. 1,194,105.

The platform, like the carriage frame, may be and here is a unitary structure of integral parts, and such parts consist of two side-pieces 30 and front and rear end connecting members or cross-pieces 31 and 32, respectively, the former having a flange 33 at its front edge to form a forward stop for the load. The side-pieces 30 are broadened or widened at the top, to whatever extent may be necessary, to afford an ample supporting area for the load, and there is an inner overhang at the top of each side-piece. The overhanging or inwardly-extending part of each side-piece 30, to which reference has just been made, is over two of the cams 13, a front cam and a back cam, and constitutes a flange 34 for such cams. There are two of the flanges 34 and depending from each are two lugs 35, one of such lugs being behind the front cam 13 and the other of such lugs behind the back cam 13, which cams are on the same side. A connecting-rod 36 extends between each of the four lugs 35 and the cam 13 in front thereof, such connecting-rod having its rear end pivoted at 37 to the lug and its front end pivoted at 38 to the cam. The side-pieces 30 are directly over the side pieces 1, and the former rest on the latter when the platform is in its normal or low position. The lugs 35 extend downward inside of the side-pieces 30 and of the side-pieces 1 and are of sufficient length to steady the platform and hold it against sidewise movement, from said side-pieces 1, even when said platform is raised to the maximum height. The two back lugs 35 are in position to encounter the cross-piece 4 of the carriage, at the end of the rearward movement of the platform or the forward movement of said carriage, and so to check and limit such movement, such lugs thus serving as stops. Likewise the head 3 limits the movement in the opposite direction, since said head and the supporting parts thereof are too high to permit the front end of the platform to pass them, or such head and parts to pass such end.

An anti-friction truck is provided on or in each side of the platform to receive directly the thrust from the cams 13 on that side, or, in other words, such anti-friction truck is interposed between each flange 34 and the cams below. The anti-friction trucks are received and operate in channels 39—39 formed by the side-pieces 30, the flanges 34, and side-pieces 40—40 that depend from the inner edges of said flanges. Beads 41 are located on adjacent sides of the entrances to the channels 39, to provide ledges or tracks for the anti-friction trucks, or in any event to constrict such entrances sufficiently to prevent said trucks from becoming displaced by dropping down out of said channels. Each channel 39 is continued through the front lug 35 on the same side, as clearly shown at 42 in Figs. 5 and 8.

Each anti-friction truck consists of a frame 43 having a plurality of rolls 44 mounted therein at each terminal, the spindles or axles for such rolls appearing at 45 in Figs. 5 and 6. There are enough rolls 44 at each end of each frame 43 to accommodate the cam 13 thereunder at all times and regardless of the positions of the parts. The cams 13 turn under the rolls 44 and the latter revolve and travel on the tops of the channels 39. The anti-friction trucks have a certain amount of independent travel, and such travel forward of each of said trucks is limited by a stop 46, Fig. 5, at the front end of the channel 39 in which the truck is located, and such travel backward is limited by the rear lug 35 which is in the path of said truck and is not pierced for the passage thereof.

When the platform is down on the carriage frame, the cams 13 are disposed well back, as represented in Fig. 2, the anti-friction trucks are at the rear end of their travel and in contact with the back lugs 35, and the foremost rolls 44 in the several sets are those that bear directly on said cams. The aforesaid rolls are bearing on the "low" portions of the cams 13 at this time. Assuming now that the carriage be held stationary and the platform drawn forward on the said carriage, it is evident that said platform must then be elevated, since the lugs 35, acting through the connecting-rods 36, force the cams 13 upwardly and forwardly and said platform is raised by said cams from the carriage frame. The cams 13 continue to carry up the platform until the latter arrives at the desired elevation. The rise is slow at the start, but, as the higher portions of the cams 13 pass under and in contact with the anti-friction truck rolls 44, the rise is accelerated. Thus the slow start, from the horizontal position of the cams 13, initially required in elevating the platform, is changed by the development of accelerated motion and the closer and still closer approach of said cams to the perpendicular, with the result that the power required is approximately equalized. Conversely or in reverse order the facts are the same, when the platform is moved or permitted to be moved backward and lowered. As the speed decreases less power is required to control the platform with its load, hence by the time the platform nearly approaches the carriage frame, it is easy to control said platform and load and prevent undue shock.

It should be observed that the pivots 38, which connect the connecting-rods 36 with the cams 13, are fixed in the cams at points somewhat remote from the highest parts and adjacent to the working edges of said cams. It is desirable, of course, to locate the pivots 38 as far as possible from the axes of the cams, in order to obtain as much leverage as possible, yet at the same time said pivots must be some distance above the horizontal plane of said axes, when said cams are in their approximately horizontal position, and also above the horizontal plane of the pivots 37, otherwise it would be difficult or impossible to start said cams upwardly. It will be seen that the above-noted factors have received the necessary attention.

Inasmuch as it is desired that the load be utilized in lowering the platform, the cams 13 and their connections must be so arranged as to prevent said cams from being swung upwardly far enough to bring their major diameters in vertical alinement with the axes of said cams, when the platform is at its maximum height. This leaves the platform, when off of the carriage frame, always supported on portions of the cams that are behind the vertical planes of the cam axes.

The cams 13 roll up under the rolls 44 of the anti-friction trucks, and said trucks are actuated forward from the rear lugs 35 to the stops 46. And the cams roll down in the same manner, the anti-friction trucks then moving rearwardly from the stops 46 to the rear lugs 35. The independent travel of the anti-friction trucks is not great, since said trucks are carried with the platform over a considerable portion of their courses, during the rise of the cams initially, and during the fall of said cams finally. It is only while the cams are approaching and leaving the perpendicular that they act to roll the anti-friction trucks forward and backward in the channels 39, independently of the platform. The cams may at times slip or slide a little on the rolls 44, but any such slipping or sliding will not be of a nature materially to affect the satisfactory operation of the parts involved or of the truck as a whole.

The sides of the anti-friction truck frames 43 are directly over the beads 41, but such sides need not rest on such beads. The cams 13 contact with the rolls 44 in the spaces between the beads 41, as is plainly to be seen in Fig. 7.

A lug 47 projects from the center of the cross-piece 31 and stop 33, and a flexible connection, as a chain 48, extends between said lug and the free end of the latch 24. The chain 48 should be long enough to permit of the necessary lost motion or play. A snap-hook 49 may be inserted in the chain 48 as a part thereof, in order that the latter may be shortened when it is necessary to operate the tongue 26, either to raise or lower the load, in a restricted space. It is the act of rocking the latch 24 on the pin 23 forward and downward, from the position which it occupies in Figs. 1 and 2, that causes the platform to be drawn forward, or the carriage to be forced backward, and said platform consequently to be elevated, said latch operating through the chain 48 and lug 47.

A gravity latch hook 50 has its rear end pivoted at 51 to two ears 52 on the front of the cross-piece 31 and stop 33 at one side of the transverse center of said members. The hook 50 is so arranged that its free end rides over the top of and drops into engagement with the front edge of the head 3, when the platform is drawn forward into elevated position, as shown in Fig. 3, for the purpose of holding said platform in such position. When the platform is in its low position the head of the hook 50 rests against the rear edge of the head 3. Pivotally mounted at 53 in a bracket 54 on the front of the head 3 is a tumbler-block or releaser 55. The top of the releaser 55 inclines from the front edge rearwardly and downwardly, and the front end of the hook 50 is similarly or correspondingly inclined, whereby said hook is enabled to drop into engagement with the head 3, as before explained, and also to ride forward over said releaser, since the latter is in line with or in the path of said hook. The latter is so hung that it normally assumes a vertical position by gravity.

In drawing the platform forward to lock the same, care should be exercised to stop as soon as the latch hook 50 drops down ready to engage the front edge of the head 3, and then, when said platform is released and settles back, said hook becomes locked to said head and holds the platform in elevated position. To unlock and release the platform, draw the same forward from locked position until the front end of said platform and the lugs 52 encounter the head 3 and the supporting parts thereof, and then permit said platform to move rearwardly and downwardly until it comes to rest on the carriage frame. The act of unlocking is effected in this manner: The hook 50 when moved forward rides over the top front edge of the releaser 55 and drops into engagement therewith, and then, as said hook is carried back by the platform, the hook tilts said releaser so as to force the beveled edge thereof into contiguity with the front of the head 3, and the hook rides up the now inclined front side of the releaser and onto said head, finally coming to rest against the back edge of the head. The top front edge of the releaser 55 is level with the top of the head 3, when said releaser is tilted in the manner just explained. As soon as the hook clears the releaser the latter assumes its normal upright position.

Locking and releasing mechanism, like that described above, is included in my application for United States Letters Patent, Serial No. 97049.

The piles or stacks of goods or material to be transported with my truck are supported from the floor at a sufficient height to enable said truck to be backed under any such stack while the platform is down, and ordinarily portable benches are provided to support such goods or material, such benches in each case being raised, carried, and set down without removing the goods therefrom.

Briefly, the operation of the truck as a whole is described as follows, starting with the parts disposed as in Figs. 1 and 2: The truck is hauled by the tongue 26 to the vicinity of the load to be moved and backed beneath the same. Then the tongue is swung up and caused to interlock with the latch 24, and forced forward and downward to raise the load, which includes the bench when present, from the floor, on or with the platform, through the medium of said latch, the chain 48, and the lug 47, the cams 13 on the rock-shafts 9 and 10, operated through the medium of the lugs 35 and connecting-rods 36, rendering the operation easy of accomplishment. As soon as the platform is raised nearly to the full extent it is locked by the latch hook 50, in the manner previously explained—see Fig. 3. Next the truck with its load is hauled by means of the tongue to the desired locality, being steered without difficulty and unhampered by the latch 24, because said tongue moves out of locking engagement with said latch as the tongue is pulled forward for hauling purposes. And, finally, the load is deposited by reëngaging the tongue tooth 29 with the latch tooth 25, forcing down said tongue to actuate the platform a little farther forward, enough so in fact for the hook 80 to advance its tooth beyond the releaser 55, and then slowly swinging said tongue upwardly and rearwardly to permit the platform to descend under the central of the tongue, until the bench rests on the floor, or the load in the absence of the bench rests upon other supporting means, said hook having meanwhile ridden up said releaser and over the head 3. The truck is now drawn from beneath the load and out of the way. The platform and load may be permitted to descend without the restraining influence of the tongue, by disengaging the tooth 29 from the tooth 25 after unlocking the platform.

When the mechanism is operated to elevate the load and the platform comes into contact with the under surface of the load, there is usually so much frictional resistance that said platform is held stationary while the carriage moves backward on the wheels 17 and 11, but the desired result of elevating the platform and carrying the load up with it is attained just the same as though the carriage were held stationary and the platform moved forwardly as well as upwardly.

By means of the cams 13 the raising and lowering operations are easily and quickly performed under conditions that require the putting forth of an approximately uniform amount of force on the part of the operator, from start to finish, or, in other words, the load in being elevated is started slowly and with the minimum expenditure of force, and then as said load continues to rise the same force is partially absorbed as it were in the increased speed with which said load moves, and, inversely, the same thing is true or the same action or kind of action takes place when the load is lowered. Thus full and complete control is given into the hands of the operator.

A portion of one side of the tongue 26, in Fig. 3, is cut away to show the engagement between the teeth 25 and 29.

What I claim as my invention, and desire to secure by Letters Patent, is—

1. In a truck, relatively movable upper and under sections, a plurality of rocking lifting members mounted in said under section and adapted to support said upper section, anti-friction rollers interposed between the bearing parts of said upper section and said members, and means pivotally connected with said upper section and with said members to operate or control said members from said upper section, when and accordingly as the latter is actuated forward or permitted to move backward.

2. In a truck, relatively movable upper and under sections, a plurality of lifting cams mounted in said under section and adapted to support said upper section, anti-friction members interposed between the bearing parts of said upper section and said cams, lugs carried by said upper section, and connecting-rods pivotally attached to said lugs and to said cams.

3. In a truck, relatively movable upper and under sections, a plurality of lifting cams mounted to rock in said under section, and adapted to support said upper section, anti-friction trucks arranged in said upper section over said cams, said anti-friction trucks comprising frames equipped with rollers for each cam, and means to operate or control said cams, from said upper section, when and accordingly as the latter is actuated forward or permitted to move backward.

4. The combination, in a truck, with a carriage, and lifting cams mounted to rock in said carriage, of a platform mounted above said cams, said platform being provided with lugs, connecting-rods between said lugs and said cams, means to actuate said platform forward, and stop members for said platform at either end of its longitudinal travel, the construction and arrangement of parts being such that said platform, when actuated forward by said actuating means, and through the medium of said lugs and said connecting rods, rocks said cams to elevate said platform.

5. The combination, in a truck, with a carriage, and lifting cams mounted to rock in said carriage, of a platform mounted above said cams, said platform being provided with front and rear lugs, connecting rods between said lugs and cams, and means to actuate said platform forward, the construction and arrangement of parts being such that said platform, when actuated forward by said actuating means, and through the medium of said lugs and said connecting-rods, rocks said cams to elevate said platform, and said carriage having a part that is in the path of said rear lugs, and with the latter serves as a back stop for said platform.

6. The combination, in a truck, with a carriage, and lifting cams mounted to rock in said carriage, of a platform mounted above said cams, said platform being provided with front and rear lugs, connecting-rods between said lugs and said cams, means to actuate said platform forward, and anti-friction trucks arranged to operate in said platform, said anti-friction trucks having rolls interposed between the bearing parts of said platform and said cams, said rear lugs serving as stops for said anti-friction trucks at the rear end of their independent travel, the construction and arrangement of parts being such that said platform, when actuated forward by said actuating means, and through the medium of said lugs and connecting-rods, rocks said cams to elevate said platform.

7. The combination, in a truck, with a carriage, and lifting cams mounted to rock in said carriage, of a platform mounted above said cams, said platform being provided with front and rear lugs, connecting-rods between said lugs and said cams, means to actuate said platform forward, anti-friction trucks arranged to operate in said platform, said anti-friction trucks having rolls interposed between the bearing parts of said platform and said cams, said rear lugs serving as stops for said anti-friction trucks at the rear end of their independent travel, and stops arranged to limit the independent forward travel of said anti-friction trucks, the construction and arrangement of parts being such that said platform, when actuated forward by said actuating means, and through the medium of said lugs and said connecting-rods, rocks said arms to elevate said platform.

8. The combination, in a truck, with a carriage, and lifting cams mounted to rock in said carriage, of a platform mounted above said cams, said platform having open-bottom longitudinal channels therein over said cams, connecting rods between said lugs and said cams, anti-friction trucks arranged in said channels for a limited amount of independent movement, said anti-friction trucks having rolls interposed between the tops of said channels and said cams, and means to actuate said platform forward, the construction and arrangement of parts being such that said platform, when actuated forward by said actuating means, and through the medium of said lugs and connecting-rods, rocks said cams to elevate said platform.

9. The combination, in a truck, with a carriage, rock-shafts journaled in said carriage, and cams secured on said rock-shafts, of a superimposed platform having overhanging parts with channels therein opening above said cams, means to operate and control said cams, from said platform, when and accordingly as the latter is actuated forward or permitted to move backward, anti-friction trucks in said channels, said anti-friction trucks having rolls interposed between the tops of said channels and said cams, means at the ends of said channels to limit the independent travel of said anti-friction trucks, and means to actuate said platform forward.

10. The combination, in a truck, with a carriage, and a plurality of lifting cams mounted to rock in said carriage, of a superimposed platform in operative position relative to said cams, said platform being provided with lugs which extend into such relation to said carriage as to support said platform from said carriage against lateral movement, and connecting-rods between said lugs and said cams.

ENOCH WHALLEY.

Witnesses:
F. A. CUTTER,
C. D. MONROE.